US 8,841,807 B2

(12) United States Patent
Taniguchi

(10) Patent No.: US 8,841,807 B2
(45) Date of Patent: Sep. 23, 2014

(54) ROTARY ELECTRIC MACHINE WITH IMPROVED MAGNETIC RESISTANCE

(75) Inventor: Makoto Taniguchi, Obu (JP)

(73) Assignee: Denso Corporation, Kariya (JP)

(*) Notice: Subject to any disclaimer, the term of this patent is extended or adjusted under 35 U.S.C. 154(b) by 259 days.

(21) Appl. No.: 13/114,432

(22) Filed: May 24, 2011

(65) Prior Publication Data

US 2011/0285243 A1 Nov. 24, 2011

(30) Foreign Application Priority Data

May 24, 2010 (JP) ................................. 2010-118358

(51) Int. Cl.
*H02K 1/16* (2006.01)
*H02K 21/16* (2006.01)
*H02K 1/27* (2006.01)

(52) U.S. Cl.
CPC ............ *H02K 21/16* (2013.01); *H02K 2213/03* (2013.01); *Y02N 10/30* (2013.01); *H02K 1/2746* (2013.01)
USPC ........................................ 310/74; 310/156.49

(58) Field of Classification Search
CPC .............................. H02K 1/146; H02K 1/165
USPC ........... 310/216.074, 156.45, 156.46, 156.48, 310/156.49, 156.54, 156.55, 156.044, 310/156.068, 156.074–156.076, 216.069, 310/216.071–216.073, 216.075, 216.079, 310/216.097
See application file for complete search history.

(56) References Cited

U.S. PATENT DOCUMENTS

| 4,354,126 A * | 10/1982 | Yates ........................ 310/156.59 |
| 4,983,867 A * | 1/1991 | Sakamoto ................... 310/49.37 |
| 5,532,531 A * | 7/1996 | Sakamoto ................... 310/49.53 |
| 6,472,789 B1 * | 10/2002 | Akemakou ............... 310/156.57 |
| 6,504,272 B2 * | 1/2003 | Sakamoto ................... 310/49.02 |
| 6,940,205 B1 | 9/2005 | Murakami et al. |
| 2003/0107290 A1 * | 6/2003 | De Filippis .................... 310/216 |
| 2004/0100154 A1 * | 5/2004 | Rahman et al. ................. 310/54 |
| 2005/0225194 A1 | 10/2005 | Murakami et al. |

(Continued)

FOREIGN PATENT DOCUMENTS

| JP | 11-89197 | 3/1999 |
| JP | 2007-295764 | 11/2007 |

OTHER PUBLICATIONS

Office Action issued in corresponding Japanese Patent Application No. 2010-118358 issued on Dec. 10, 2013 (with translation).

*Primary Examiner* — Quyen Leung
*Assistant Examiner* — Naishadh Desai
(74) *Attorney, Agent, or Firm* — Nixon & Vanderhye, P.C.

(57) ABSTRACT

In a motor, an armature includes an annular yoke having an inner surface, and a plurality of teeth radially projecting individually from the inner surface of the annular yoke, and a rotor is rotatably provided inside the armature with a gap between the outer surface thereof and the inner surface of the armature. The armature and rotor is configured to have a first magnetic resistance facilitating reactive magnetic flux to flow through at least one tooth in a plurality of teeth to an adjacent tooth of the at least one tooth therein as compared with the reactive magnetic flux toward the rotor. The armature and rotor is configured to have a second magnetic resistance facilitating main magnetic flux based on the at least one pair of magnetic poles to flow toward a yoke of the armature as compared with the main magnetic flux toward at least one tooth close to the main magnetic flux.

13 Claims, 6 Drawing Sheets

(56) References Cited

U.S. PATENT DOCUMENTS

| | | | |
|---|---|---|---|
| 2007/0040467 A1* | 2/2007 | Gu | 310/216 |
| 2007/0205687 A1 | 9/2007 | Murakami et al. | |
| 2007/0205688 A1 | 9/2007 | Murakami et al. | |
| 2008/0296992 A1* | 12/2008 | Militzer | 310/179 |

* cited by examiner

ROTARY ELECTRIC MACHINE WITH IMPROVED MAGNETIC RESISTANCE

CROSS REFERENCE TO RELATED APPLICATIONS

This application is based on Japanese Patent Application 2010-118358 filed on May 24, 2010. This application claims the benefit of priority from the Japanese Patent Application, so that the descriptions of which are all incorporated herein by reference.

TECHNICAL FIELD

The present disclosure relates to rotary electric machines for use in home electric appliances, industrial devices, motor vehicles, and so on.

BACKGROUND

Concentrated winding motors, which are examples of rotating-field motors, are applied to various applications, such as home electric appliances, industrial devices, motor vehicles because of their ease of manufacture. However, these concentrated winding motors cause noise because the waveform of induced voltages in their concentrated armature windings is likely to be distorted due to the relatively short winding pitches of their concentrated windings. This noise is especially noticeable when a concentrated winding motor is used as a brushless motor for motor vehicles.

In contrast, distributed winding motors, which are examples of rotating-field motors, can reduce noise because of the relatively long winding pitches of their distributed armature windings, an example of which is disclosed in Japanese Patent Application Publication No. 2007-295764.

SUMMARY

However, such a distributed winding motor has armature coils with their ends whose wire length is longer than that of ends of armature coils of a concentrated winding motor, resulting in that the resistance of the armature windings of a distributed winding motor is higher than that of the armature windings of a concentrated winding motor. Thus, even if so-called "field weakening", which is a process of weakening the magnetic field of the rotor of a rotating-field motor to thereby increase the motor's output torque while the rotating-field motor is rotating especially within a higher speed range, is applied to a distributed winding motor, this application is less effective for the distributed winding motor.

For example, FIG. 1 shows an example of the torque-speed characteristic of a distributed winding motor, which is illustrated by the dashed lines L1. The torque-speed characteristic L1 demonstrates that the output torque of the distributed winding motor rapidly drops with increase in the rotational speed of the distributed winding motor to which the field weakening is applied.

In contrast, as expressed by the dashed-dot lines L2, FIG. 1 shows an example of the torque-speed characteristic of a concentrated winding motor to which the field weakening is applied; the structure of the concentrated winding motor is substantially identical to that of the distributed winding motor except for the winding configuration. The torque-speed characteristic L2 demonstrates that the output torque of the concentrated winding motor is gradually reduced as compared with the output torque of the distributed winding motor as the rotational speed of the concentrated winding motor increases.

One main reason why the field weakening is little effective for distributed winding motors is as follows:

An increase in the rotational speed of a rotating-field motor increases the back electromotive force generated from the rotating-field motor, resulting in reduction of armature current. Because the back electromotive force is proportional to the rotational speed of the rotating-field motor and the strength of the magnetic field generated by the rotor, it is necessary to reduce the back electromotive force to thereby increase the armature current.

The field weakening is thus to generate reactive magnetic flux against the magnetic flux of the rotor of a rotating-field motor to thereby weaken the magnetic flux of the rotor. Thus, in order to carry out the field weakening, it is necessary to apply a voltage to the armature windings; this voltage has a level that allows the reactive magnetic flux generated based on the voltage to counter the magnetic field generated by the rotor.

However, as described above, because the resistance of the armature windings of the distributed winding motor is relatively high so that voltage drop across the armature windings is relatively large. This may make it difficult to apply the voltage with the sufficient level to the armature windings, resulting in that the reactive magnetic flux generated based on a voltage with an insufficient level applied to the armature windings may be insufficient to counter the magnetic field generated by the rotor. Thus, even if the field weakening is applied to the distributed winding motor, the back electromotive force cannot be sufficiently reduced, resulting in limitation of increase in the rotational speed of the distributed winding motor.

Particularly, distributed winding motors for motor vehicles are driven on lead-acid batteries installed in the motor vehicles; these lead-acid batteries for motor vehicles normally have a low rated voltage of 12 Volts [V]. That is, the voltage to be applied to the armature windings of a distributed winding motor for a motor vehicle is limited to the low rated voltage of 12 [V] of a lead-acid battery installed in the motor vehicle. Thus, the limitation of increase in their rotational speeds of distributed motors can be particularly severe in the distributed motors to be installed in motor vehicles.

In view of the circumstances set forth above, an aspect of the present disclosure seeks to provide rotary electric machines designed to solve at least one of the problems set forth above.

Specifically, an alternative aspect of the present disclosure aims to provide such rotary electric machines each capable of generating reactive magnetic flux sufficient to counter the magnetic flux of its rotor to thereby reduce the back electromotive force generated from the rotary electric machine.

According to one aspect of the present disclosure, there is provided a rotary electric machine. The rotary electric machine includes an armature. The armature includes an annular yoke having an inner surface, and a plurality of teeth radially projecting individually from the inner surface of the annular yoke. The plurality of teeth are circumferentially arranged to provide a plurality of slots therebetween, projecting end surfaces of the plurality of teeth providing an inner surface of the armature. The armature is designed to generate reactive magnetic flux when energized. The rotary electric machine includes a rotor having at least one pair of magnetic poles and having an outer surface. The rotor is rotatably provided inside the armature with a gap between the outer surface thereof and the inner surface of the armature. The armature and rotor is configured to have a first magnetic resistance facilitating the reactive magnetic flux to flow through at least one tooth in the plurality of teeth to an adjacent tooth of the at least one tooth therein as compared with the reactive magnetic flux toward the rotor. The armature and rotor is configured to have a second magnetic resistance facilitating main magnetic flux based on the at least one pair of magnetic poles to flow toward the yoke as compared with the main magnetic flux toward at least one tooth close to the main magnetic flux.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
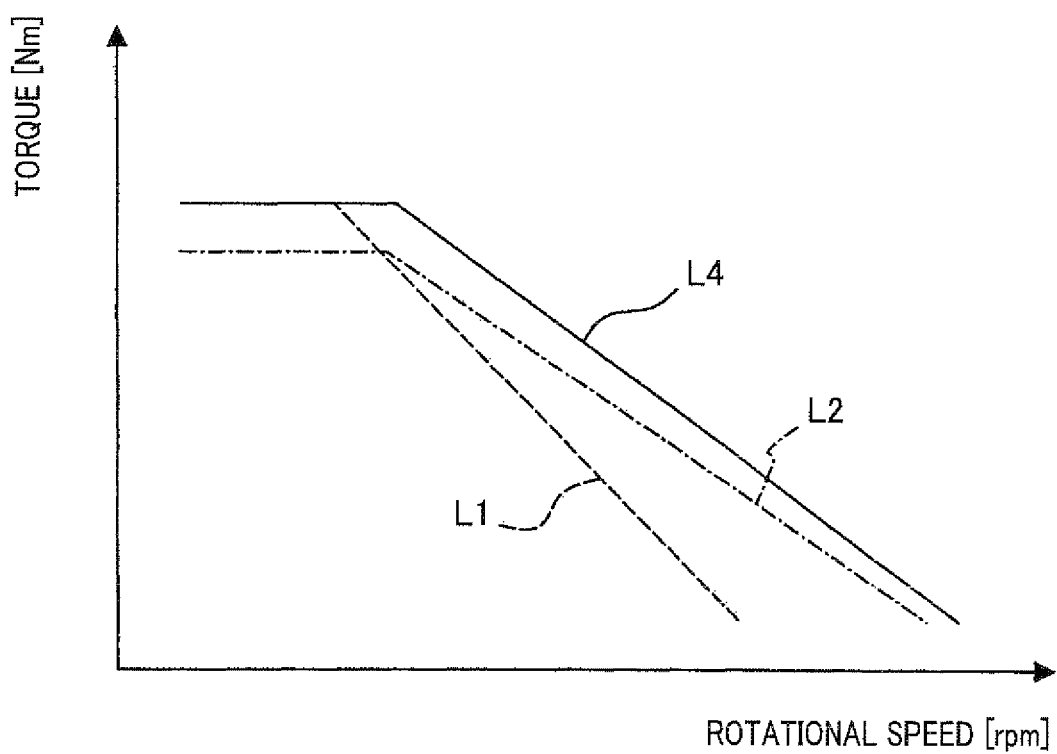
FIG. 1 is a graph schematically illustrating examples of the torque-speed characteristic of a distributed winding motor, the torque-speed characteristic of a concentrated winding motor, and the torque-speed characteristic of a three-phase, 60-slot, 10-pole motor according to an embodiment of the present disclosure.

An embodiment of the present disclosure will be described hereinafter with reference to the accompanying drawings. In the drawings, identical reference characters are utilized to identify corresponding identical components. Note that, in order to simply illustrate the structure and operations of the embodiments, hatching is omitted in illustration in some of the accompanying drawings.

Figure 2A:
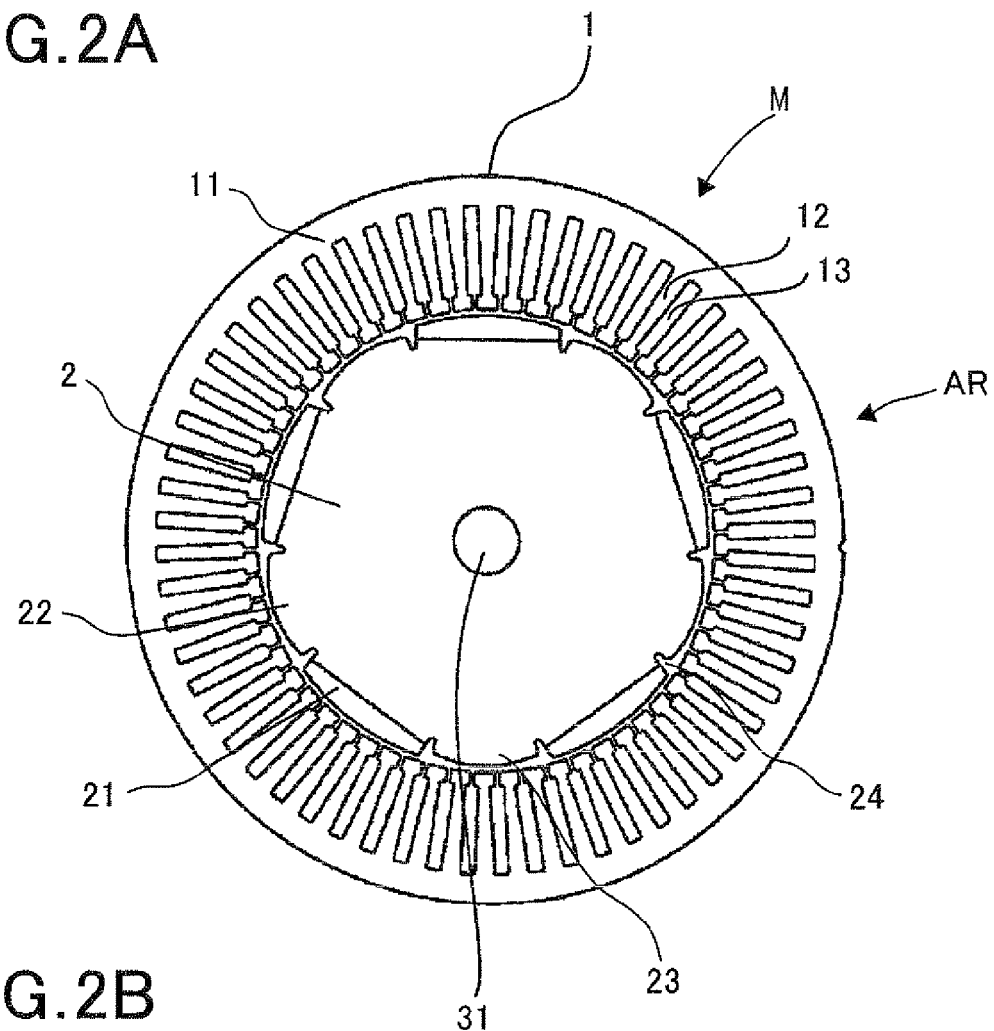
FIG. 2A is a lateral cross sectional view of the motor according to the embodiment of the present disclosure.
Figure 2B:
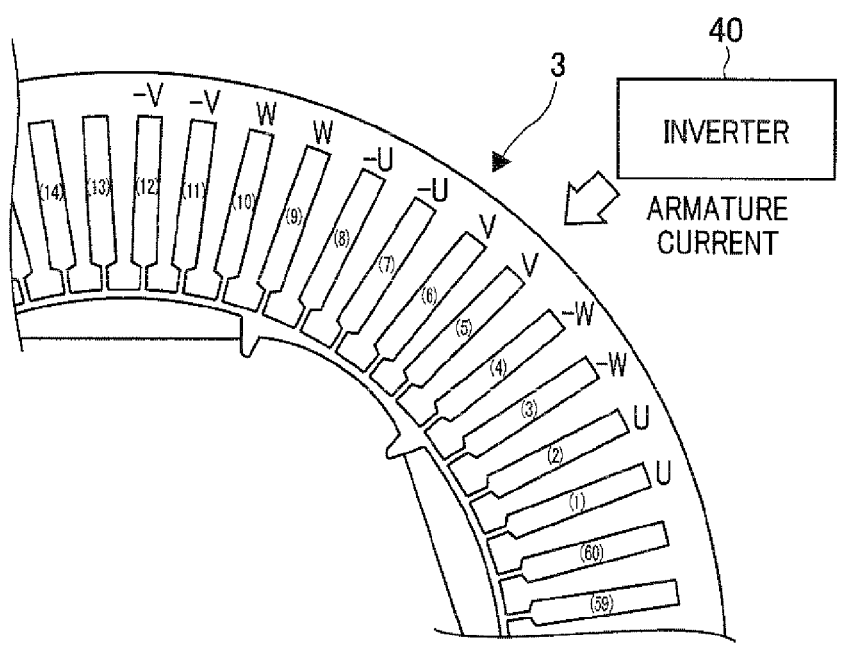
FIG. 2B is an enlarged cross sectional view of a part of the motor illustrated in FIG. 2A.

Referring to the drawings, particularly to FIGS. 2A and 2B, there is illustrated a three-phase, 60-slot, 10-pole motor M with a substantially cylindrical shape, referred to simply as a "motor M".

The motor M is comprised of: an armature AR consisting of a substantially annular armature core 1 with a given axial thickness; and a substantially annular rotor 2 arranged coaxially with respect to the armature core 1 and opposite to the armature core 1 with a gap therebetween. The motor M is also comprised of a rotary shaft 31 made of, for example, a non-magnetic material, such as stainless steel.

The rotor 2 is made of magnetic steel sheets as an example of soft magnetic materials, and is comprised of a substantially annular yoke (core) 22 with its inner periphery to which the rotary shaft 31 is fixed. The rotor 2 is also comprised of five permanent magnet poles 21 made of, for example, rear-earth magnets. The five permanent magnet poles 21 have the same magnetic polarity, such as the north or south pole, and are mounted on the outer periphery of the yoke 22. The five permanent magnet poles 21 are circumferentially arranged at regular pitches therebetween. In this embodiment, each of the five permanent magnet poles 21 has the north polarity.

The outer surface of each of the permanent magnet poles 21 is curved with a predetermined radius of curvature around the center axis of the rotary shaft 31.

The yoke 22 is provided with five radially outwardly extending projections 23 disposed respectively between the five permanent magnet poles 21 and circumferentially arranged at regular pitches. With the configuration of the rotor 2, the magnetic polarities of the five permanent magnet poles 21 cause the five projections 23 to be consequently magnetized as the same magnetic polarity opposite to the magnetic polarity of the five permanent magnet poles 21; these projections 23 will be therefore referred to as "consequent poles 23" hereinafter. In this embodiment, the consequent poles 23 have the south polarity.

The yoke 22 is comprised of spaces 24 between the permanent magnet poles 21 and the consequent poles 23; these spaces 24 serve as magnetic barriers between the permanent magnet poles 21 and the consequent poles 23. The outer surface of each of the consequent poles 23 is curved with a predetermined radius of curvature around the center axis of the rotary shaft 31. The rotor 2 has one pole-pair pitch of 72 mechanical degrees corresponding to 360 electrical degrees.

The curved outer surfaces of the respective magnetic poles 21 and 23 provide an outer surface of the rotor 2.

The armature core 1 consists of an annular yoke 11 with a given axial thickness, and sixty teeth 12 radially inwardly projecting from the inner surface of the yoke 11. Specifically, the three-phase, 60-slot, 10-pole motor M is designed such that the number of poles is ten, the number of phase of the motor M is three, the number of teeth 12 per pole and phase is two, the total number of teeth 12 is sixty obtained by the following equation "10×2×3=60".

The sixty teeth 12 are circumferentially arranged at regular pitches therebetween. Spaces surrounded by circumferentially adjacent teeth and the yoke 11 provide sixty slots of the armature core 1; each of the sixth slots has a rectangular shape in its radial cross section.

As illustrated in FIGS. 2A and 2B, there are twelve teeth 12 of the armature core 1 within 72 mechanical degrees corresponding to one pole-pair pitch of the rotor 2. The pitch between adjacent slots (teeth 12) of the armature core 1 is set to 30 electrical degrees, which is an integer submultiple of 60 electrical degrees.

For example, the armature core 1 is manufactured by: punching a previously designed core segment from each of a plurality of thin magnetic steel sheets using a punch and a die, and laminating the plurality of core segments on each other.

The armature AR also includes three-phase armature windings 3 (see FIG. 2B) wound in the armature core 1 in, for example, distributed, full pitch winding configuration. As each of the three-phase armature windings 3, the joint of a plurality of conductor segments each consisting of a pair of in-slot portions and a turn portion joining the paired in-slot portions or a continuous wire having a rectangular or circular shape in its lateral cross section can be used.

For example, in one electric angular cycle (360 electrical degrees) of the armature core 1, which corresponds to one pole-pair pitch of the rotor 2, including twelve slots (1), (2), ..., (12), a first U-phase coil is wound in the first slot (1) and the seventh slot (7), and a second U-phase coil is wound in the second slot (2) and the eighth slot (8). The first U-phase coil and the second U-phase coil are, for example, connected in series to provide the U-phase winding. Reference characters "U" and "−U" represent directions of an armature current (U-phase alternating current) flowing through each of the first and second U-phase coils. For example, the U-phase alternating current flowing through the portion of the first U-phase coil in the first slot (1) is opposite in direction to that flowing through the portion of the first U-phase coil in the seventh slot (7).

Similarly, in one electric angular cycle (360 electrical degrees) of the armature core 1, a first V-phase coil is wound in the fifth slot (5) and the eleventh slot (11), and a second V-phase coil is wound in the sixth slot (6) and the twelfth slot (12). The first V-phase coil and the second V-phase coil are, for example, connected in series to provide the V-phase winding. Reference characters "V" and "−V" represent directions of an armature current (V-phase alternating current) flowing through each of the first and second V-phase coils. For example, the V-phase alternating current flowing through the portion of the first V-phase coil in the fifth slot (5) is opposite in direction to that flowing through the portion of the first V-phase coil in the eleventh slot (11).

In addition, in one electric angular cycle (360 electrical degrees) of the armature core 1, a first W-phase coil is wound in the ninth slot (9) and the third slot (3), and a second W-phase coil is wound in the tenth slot (10) and the fourth slot (4). The first W-phase coil and the second W-phase coil are, for example, connected in series to provide the W-phase winding. Reference characters "W" and "−W" represent directions of an armature current (W-phase alternating current) flowing through each of the first and second W-phase coils. For example, the W-phase alternating current flowing through the portion of the first W-phase coil in the ninth slot (9) is opposite in direction to that flowing through the portion of the first W-phase coil in the third slot (3).

As well as the first set of the slots (1) to (12), U-, V-, and W-phase windings 3 are wound in each of: the second set of the slots (13) to (24), the third set of the slots (25) to (36), the fourth set of the slots (37) to (48), and the fifth set of the slots (49) to (60). In other words, the armature windings 3 are classified into: the first group of armature windings wound in the first set of the slots (1) to (12), the second group of armature windings wound in the second set of the slots (13) to (24), the third group of armature windings wound in the third set of the slots (25) to (36), the fourth group of armature windings wound in the fourth set of the slots (37) to (48), and the fifth group of armature windings wound in the fifth set of the slots (49) to (60).

The armature currents (U-, V-, and V-phase alternating currents) have a phase difference of 120 degrees; these armature currents are supplied based on three-phase AC voltages applied from an inverter 40; this inverter 40 generates the three-phase AC voltages based on, for example, a lead-acid battery installed in the motor vehicle having a low rated voltage of 12 [V].

Applying one cycle (360 electrical degrees) of the armature currents to the first group of armature windings creates one cycle (360 electrical degrees) of a rotating magnetic field. In other words, the magnetic field created by the armature currents supplied to each group of armature windings rotates by 360 electrical degrees corresponding to the mechanical angle of 75 degrees. Thus, applying the armature currents sequentially to the respective first to fifth groups of armature windings creates a continuous rotating magnetic field having five pole-pairs around the armature core 1 (360 mechanical degrees).

Each of the first and second U-phase coils, the first and second V-phase coils, and the first and second W-phase coils can be individually driven as two pairs of three-phase windings by a pair of inverters.

Magnetic interaction between the continuous rotating magnetic field and each of the poles (the permanent magnet poles 21 and consequent poles 23) of the rotor 2 creates torque to turn the rotor 2.

Next, the structure of the armature AR will be described in detail hereinafter.

Figure 3:
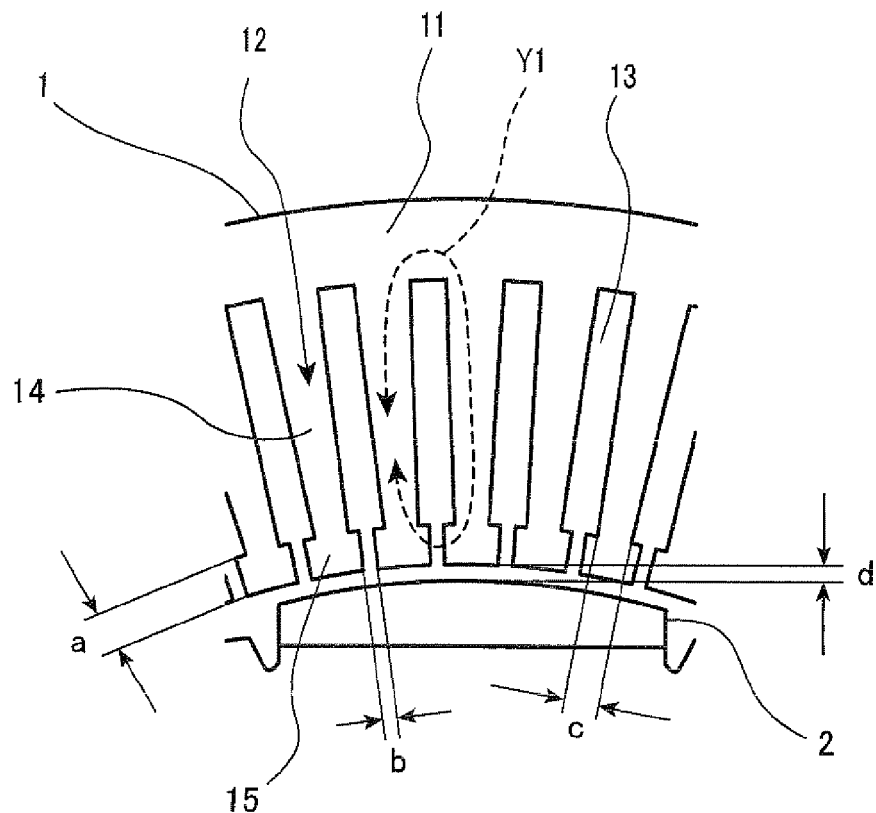
FIG. 3 is an enlarged view of a part of an armature core of an armature and a part of a rotor of the motor illustrated in FIG. 2A.

As illustrated in FIG. 3, each of the teeth 12 comprises a first portion 14 extending from the inner surface of the yoke 11 to be tapered toward the rotary shaft 31 to have a substantially trapezoid shape in its radial cross section. Each of the teeth 12 also comprises a second portion (magnetic-path extension) 15 radially extending (projecting) from the innermost end of the first portion 13 to face the outer surface of the rotor 2 and having a substantially rectangular shape in its radial cross section. The second portion 15 of each of the teeth 12 has a width substantially in the circumferential direction of the rotor 2; this width is longer than the width of the inner most end of the first portion 14 in the circumferential direction of the rotor 2. That is, the end surfaces of the second portions 15 of the teeth 12 provide the inner surface of the armature core 1, and the inner surface of the armature core 1 and the outer surface of the rotor 2 provide the gap between the armature core 1 and the rotor 2.

The second portions 15 of the teeth 12 serve as a magnetic path through which magnetic flux generated by the rotor 2 and that generated by the armature AR pass.

As illustrated in FIG. 3, the second portions 15 of the teeth 12 are circumferentially arranged with regular spaces therebetween. The circumferential length of each of the spaces between the second portions 15 of the teeth 12 is expressed by "b", and the radial thickness of each of the second portions 15 is expressed by "a". The width of the inner most end of the first portion 14 in the circumferential direction of the rotor 2 is expressed by "c", and the radial length of the gap between the inner surface of the armature core 1 and the outer surface of the rotor 2 is expressed by "d". Each of the spaces between the second portions 15 of the teeth 12 can also be expressed by "b", and the gap between the inner surface of the armature core 1 and the outer surface of the rotor 2 can also be expressed by "d" hereinafter.

That is, the armature core 1 according to this embodiment is provided with each of the second portions 15 of the teeth 12 having a specific configuration defined by the parameters a, b, c, and d; this specific configuration provides improved magnetoresistance characteristics of the magnetic path through the second portions 15 of the teeth 12.

Figure 4:
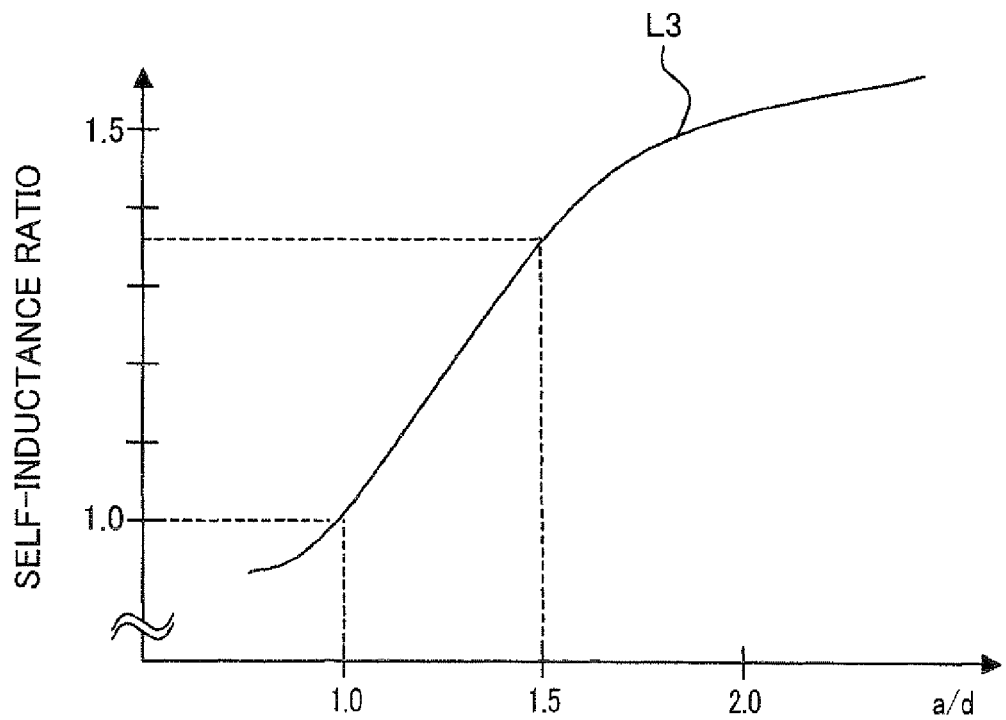
FIG. 4 is a graph schematically illustrating a change of the self-inductance of one-phase armature winding of three-phase armature windings relative to the ratio of the radial thickness a of each second portion of the armature core to the radial length d of the gap between the inner surface of the armature core 1 and the outer surface of the rotor according to the embodiment.

FIG. 4 shows, as a curve L3, a change of the self-inductance of one-phase armature winding of the three-phase armature windings relative to the ratio of the parameter a to the parameter d (a/d) when the self-inductance of the one-phase armature winding with the ratio a/d being set to 1.0 is set to 1.0. This characteristic of the self-inductance of the one-phase armature winding was obtained by experiments using the motor M.

FIG. 4 demonstrates that the increase in the ratio a/d monotonically increases the self-inductance of the one-phase armature winding because of reduction of the magnetic saturation in the second portions 15 of the teeth 12. When the ratio a/d becomes 2.0, the self-inductance of the one-phase armature winding becomes substantially 1.35. That is, the self-inductance of the one-phase armature winding with the ratio a/d of 2.0 is substantially 1.35 times of the self-inductance of the one-phase armature winding with the ratio a/d of 1.0. This is because an increase in the radial thickness a of each of the second portions 15 relative to the radial length d of the gap allows magnetic saturation in the second portion 15 to be reduced. The increase in the self-inductance of the one-phase armature winding means that the magnetic resistance of a magnetic path through one second portion 15 is lower than that of a magnetic path through the gap between the inner surface of the armature core 1 and the outer surface of the rotor 2.

This results in that reactive magnetic flux generated based on the energized armature windings through a second portion 15, which has a magnetic polarity, against a main magnetic flux of a magnetic pole of the rotor 2 opposite to the second portion 15 with the same magnetic polarity is difficult to flow through the gap between the inner surface of the armature core 1 and the outer surface of the rotor 2 as compared with through the second portion 15. In other words, the magnetic path of the reactive magnetic flux that links to one phase armature winding through the second portion 15 is reduced. This sufficiently generates interlinkage magnetic flux to one phase armature winding through a second portion 15 irrespective of using low armature current (voltage) to weaken the effects of a main magnetic flux of a magnetic pole of the rotating rotor 2 opposite to the second portion 15; this main magnetic flux attempts to link to the one phase armature winding. This reduces the main magnetic flux of a magnetic pole of the rotating rotor 2 opposite to each of the second portions 15, thus reducing the back electromotive force generated from the motor M. The reduction in the back electromotive force generated from the motor M allows the rotational speed of the motor M (rotor 2) to be increased with little consideration of the back electromotive force.

For example, the motor M according to this embodiment is designed such that the ratio a/d is 2.0. The torque-speed characteristic L4 of the motor M is illustrated in FIG. 1 obtained assuming that the structure of the motor M is substantially identical to that of the distributed winding motor corresponding to the torque-speed characteristic L2 except for the features of the motor M according to this embodiment.

Referring to FIG. 1, the torque-speed characteristic L4 demonstrates that the rate of decrease of the output torque of the motor M relative to an increase in the rotational speed of the motor M is lower than that of decrease of the output torque of each of the conventional motors with the torque-speed characteristics L1 and L2. Thus, it is possible to increase the rotational speed of the motor M up to a level higher than the rotational speed of each of the conventional motors with the torque-speed characteristics L1 and L2.

Note that the ratio a/d can be set to a value higher than 2.0. However, because an excessively increased value of the ratio a/d may reduce the area of the slots, resulting in an increase of the resistance of the three-phase armature windings, it is preferable to design the motor M depending on its intended use.

In addition, the motor M according to this embodiment is designed such that the parameter b is set to be equal to or lower than the parameter d. Why the relationship between the parameters b and d of the motor M is determined will be described hereinafter with reference to FIG. 5A.

Figure 5A:
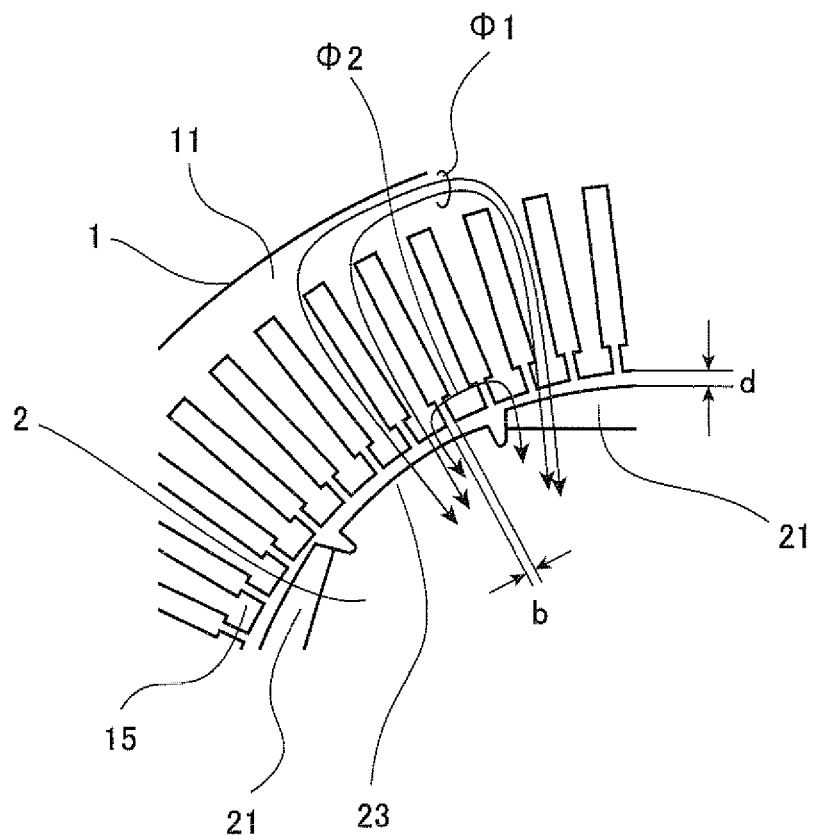
FIG. 5A is an enlarged view of a part of the armature core of the armature and a part of the rotor of the motor illustrated in FIG. 2A.

FIG. 5A schematically illustrates the flow of a main magnetic flux of a magnetic pole of the rotor 2. In FIG. 5A, the main magnetic flux is generated from a permanent magnet pole 21, and includes interlinkage flux $\phi 1$ interlinked to an armature winding of the armature AR, and leakage flux $\phi 2$ flowing through teeth 12 close to the permanent magnetic pole 21 and returning to a consequent pole 23 adjacent to the permanent magnet pole 21.

As illustrated in FIG. 5A, the leakage flux $\phi 2$ must flow, in addition to the gap d, through at least one space b. However, because the interlinkage flux $\phi 1$ flows through the yoke 11 back to a consequent pole 23, the interlinkage flux $\phi 1$ passes through the gap d without through spaces b. Thus, the magnetic resistance of a magnetic path of the interlinkage flux $\phi 1$ is extremely smaller than that of a magnetic path of the leakage flux $\phi 2$.

In other words, if the second portions 15 were joined to each other by magnetic materials, the leakage flux $\phi 2$ would extremely increase so that the output torque of the motor M at a low speed range would be reduced.

Thus, it is necessary to provide the spaces b, each of which has an appropriate length, between the second portions 15.

Figure 6:
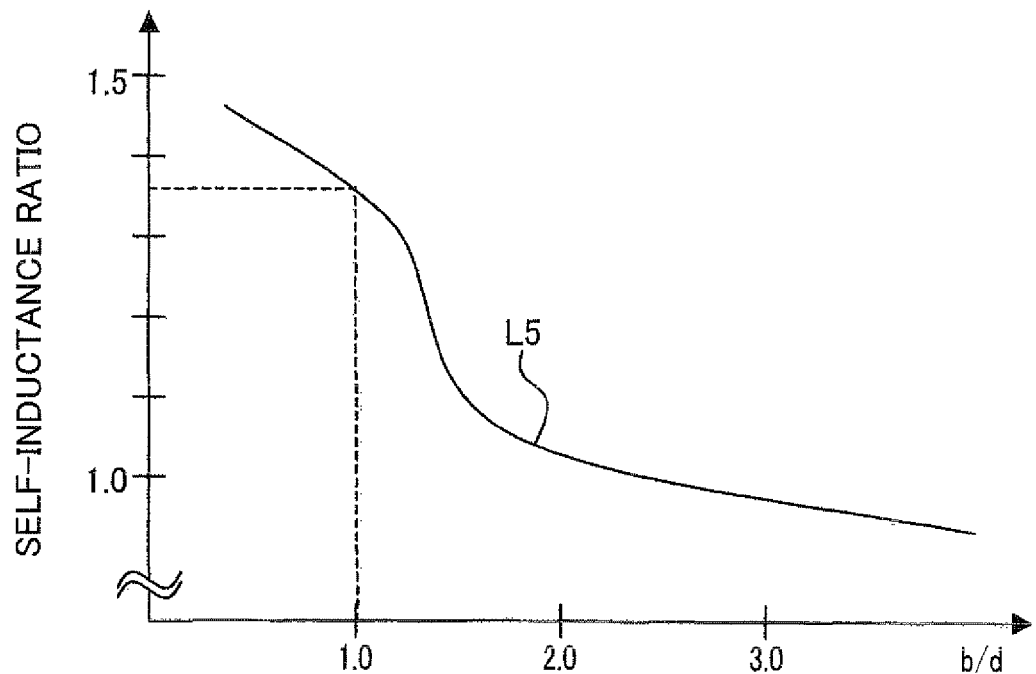
FIG. 6 is a graph schematically illustrating a change of the self-inductance of one-phase armature winding of the three-phase armature windings relative to the ratio of the circumferential length b of each space between second portions of the armature core to the length d of the gap between the inner surface of the armature core and the outer surface of the rotor.

FIG. 6 shows, as a curve L5, a change of the self-inductance of one-phase armature winding of the three-phase armature windings 3 relative to the ratio of the circumferential length b of each space between second portions 15 to the length d of the gap between the inner surface of the armature core 1 and the outer surface of the rotor 2 (b/d) with reference to the self-inductance of the one-phase armature winding of 1.0. This characteristic of the self-inductance of the one-phase armature winding was obtained by experiments using the motor M.

FIG. 6 demonstrates that, if the circumferential length b of each space between second portions 15 is longer than the length d of the gap between the inner surface of the armature core 1 and the outer surface of the rotor 2, that is, the ratio b/d is higher than 1.0, the self-inductance of the one-phase armature winding extremely drops due to, for example, the magnetic saturation of the second portions 15 of the teeth 12. Thus, it is preferable that the circumferential length b of each space between second portions 15 is equal to or shorter than the length d of the gap between the inner surface of the armature core 1 and the outer surface of the rotor 2.

Figure 5B:
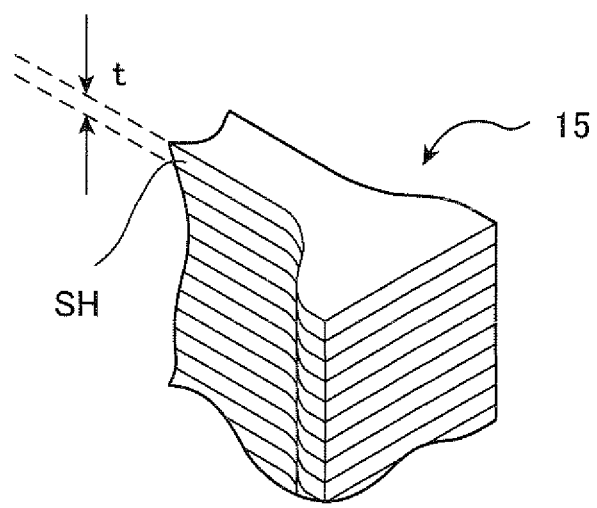
FIG. 5B is an enlarged perspective view of a second portion of the armature core.

However, as described above, the armature core 1 is manufactured by: punching a previously designed core segment from each of a plurality of thin magnetic steel sheets SH using a punch and a die, and laminating the plurality of core segments on each other (see FIG. 5B). Thus, the circumferential length b of each space between second portions 15 is required to be longer than the thickness t of each of the plurality of thin magnetic steel sheets SH for performance reasons. This is because, if the circumferential length b of each space between second portions 15 were shorter than the thickness t of each of the plurality of thin magnetic steel sheets SH, it would be difficult to punch the previously designed core segment from each of the plurality of thin magnetic steel sheets SH using a punch and a die, resulting in an increase of the number of man-hours for manufacturing the armature core 1.

Thus, the motor M according to this embodiment is designed such that the ratio b/d is equal to or lower than 1.0, and the circumferential length b of each space between second portions 15 is longer than the thickness t of each of the plurality of thin magnetic steel sheets SH: this design of the circumferential length b of each space between second portions 15 allows the previously designed core segment to be easily punched out from each of the plurality of thin magnetic steel sheets SH.

This makes it possible to maintain the self-inductance of each of the three-phase armature windings at a high level while reducing the number of man-hours for manufacturing the armature core 1.

In addition, as illustrated by dashed lines Y1 in FIG. 3, a magnetic path through a pair of adjacent second portions 15 passes through a corresponding pair of teeth 12 and a corresponding portion of the yoke 11. For this reason, it is preferable that the radial thickness a of each of the second portions 15 is greater than the width c of the inner most end of the first portion 14 in the circumferential direction of the rotor 2. This aims to prevent the magnetic saturation of the second portions 15 of the teeth 12.

Figure 7:
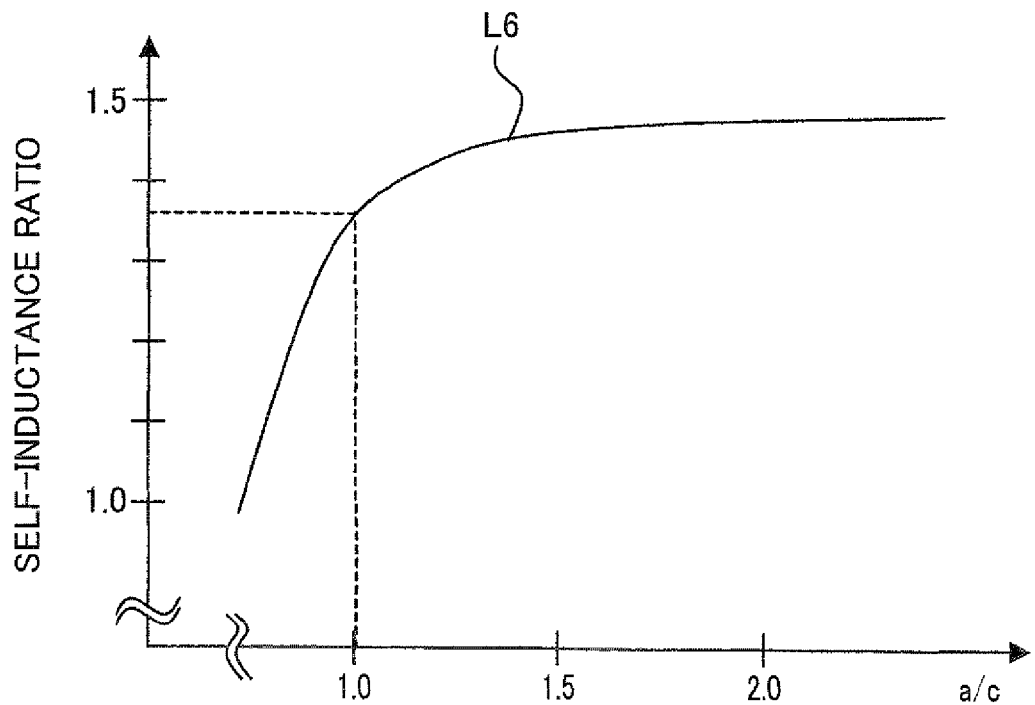
FIG. 7 is a graph schematically illustrating a change of the self-inductance of one-phase armature winding of the three-phase armature windings relative to the ratio of the radial thickness a of each second portion of the armature core to the circumferential width c of the inner most end of each first portion of the armature core.

FIG. 7 is a graph schematically illustrating a change of the self-inductance of one-phase armature winding of the three-phase armature windings 3 relative to the ratio of the radial thickness a of each second portion of the armature core 1 to the circumferential width c of the inner most end of each first portion 14 of the armature core 1.

Specifically, as illustrated by a curve L6 in FIG. 7, if the ratio a/c is equal to or lower than 1.0, that is, the radial thickness a of each second portion 15 is equal to or smaller than the circumferential width c of the inner most end of each first portion 14, each second portion 15 has the narrowest width in a magnetic path therethrough, resulting in that the self inductance of each armature winding 3 changes significantly with change in the ratio of a/c because the parameters a and c of the second portions 15 are factors governing the self inductances of the armature windings 3.

However, if the ratio a/c is higher than 1.0, that is, the radial thickness a of each of the second portions 15 is greater than the circumferential width c of the inner most end of each first portion 14, the circumferential width c of the inner most end of each first portion 14 is the narrowest width in a magnetic path through a corresponding second portion 15, resulting in that the self inductance of each armature winding 3 gradually changes even if the radial thickness a of each of the second portions 15 is increased.

Note that, if a continuous wire having a circular shape in its lateral cross section were used as each of the three-phase armature windings 3 and the diameter of the continuous wire were shorter than the circumferential length b of each space between second portions 15, it would be difficult to insert continuous wires into corresponding slots of the armature core 1 from their inner sides through corresponding spaces b.

Thus, it is preferable that the motor M according to this embodiment uses joint of a plurality of conductor segments as each of the three-phase armature windings 3 wound in the armature core 1 in distributed, full pitch winding configuration.

Figure 8:
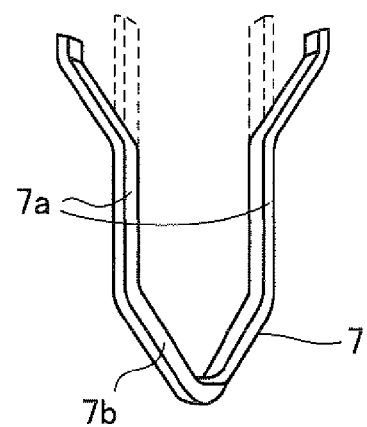
FIG. 8 is an enlarged perspective view of a conductor segment to be used for armature windings of the armature.

As illustrated in FIG. 8, the plurality of conductor segments 7 are provided. Each of the plurality of conductor segments 7 consists of a pair of in-slot portions 7a and a U- or V-shaped turn portion 7b such that each in-slot portion 7a extends at its one end from a corresponding one end of the turn portion 7b. Before installation of each conductor segment 7 in the armature core 1, the other end of each of the in-slot portions 7a straightly extends.

Figure 9:
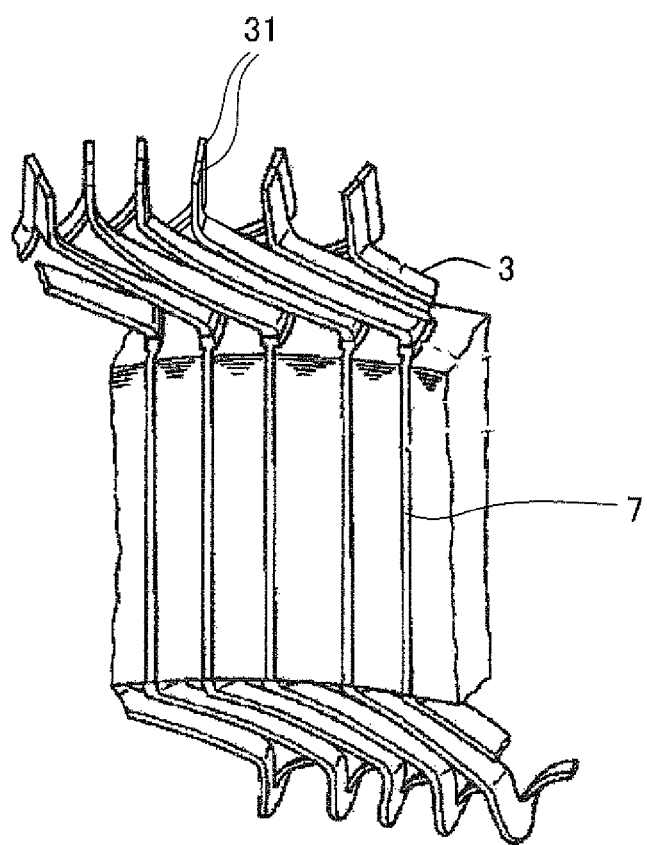
FIG. 9 is an enlarged perspective view of a part of the motor.

One of the in-slot portions 7a of one conductor segment 7 is inserted into a corresponding slot of the armature core 1 and the other of the in-slot portions 7a is inserted into a corresponding slot of the armature core 1 from the bottom of the paper of FIG. 9 so that the other ends of the in-slot portions 7a project from the corresponding slots of the armature core 1. These other ends of the in-slot portions 7a projecting out of the corresponding slots (the armature core 1) will be referred to as "projecting end portions" hereinafter.

Thereafter, each of the projecting end portions of the one conductor segment 7 is bent to be inclined outward by a predetermined electric angle with respect to the axial direction of a corresponding slot. After the bending, a tip end of each of the projecting end portions of the conductor segment 7 is joined by welding (see reference character 31 in FIG. 9) to a tip end of a corresponding one of the projecting end portions of an alternative conductor segment 7 inserted in corresponding slots in the same manner as the one conductor segment 7.

That is, the plurality of conductor segments 7 are inserted into corresponding slots of the armature core 1, the projecting end portions of each of the inserted conductor segments 7 are bent, and a tip end of each of the projecting end portions of each of the conductor segments 7 is joined by welding to a tip end of a corresponding one of the projecting end portions of a corresponding one of the inserted conductor segments 7. This provides the three-phase armature windings 3, each of which consists of the joint of a number of conductor segments 7, wound in the armature core 1 in distributed, full pitch winding configuration.

This winding configuration allows the coil ends of the armature windings 3 to be aligned in, for example, the circumferential and radial direction of the motor M. This makes it possible to reduce the motor M in size. Usually, motors whose armature windings have distributed winding configuration may generally increase the length of the coil ends of the armature windings, deteriorating the downsizing of the motors. However, the motor M whose armature windings 3 each consists of the joint of a plurality of conductor segments prevents the length of the coil ends of the armature windings from being increased. This winding configuration makes it possible to easily manufacturing the motor M because of, for example, no operations of winding of continuous wires. Particularly, using each of the plurality of conductor segments 7 having a rectangular shape in its lateral cross section can increase the electric loading of the motor M, in other words, the number of ampere-turns in each of the three-phase armature windings 3.

As described above, the motor M as an example of rotary electric machines is comprised of an armature AR and a rotor 2. The armature AR includes an annular yoke 11 having an inner surface, and a plurality of teeth 12 radially projecting individually from the inner surface of the annular yoke 11. The plurality of teeth 12 are circumferentially arranged to provide a plurality of slots therebetween. Projecting end surfaces of the plurality of teeth 12 provide an inner surface of the armature AR. The armature AR is designed to generate reactive magnetic flux when energized. The rotor 2 has at least one pair of magnetic poles 21 and 23, and has an outer surface. The rotor 2 is rotatably provided inside the armature AR with a gap between the outer surface thereof and the inner surface of the armature AR.

The armature AR and the rotor 2 are specially configured to have:

a first magnetic resistance facilitating the reactive magnetic flux to flow through at least one tooth 12 in the plurality of teeth 12 to an adjacent tooth 12 therein as compared with the reactive magnetic flux toward the rotor 2, and a second magnetic resistance facilitating the main magnetic flux to flow toward the yoke 11 as compared with the main magnetic flux toward at least one tooth 12 close to the main magnetic flux.

In other words, the armature AR and the rotor 2 are specially configured such that:

a magnetic resistance for the reactive magnetic flux that flows through at least one tooth 12 in the plurality of teeth 12 to an adjacent tooth 12 is smaller than a magnetic resistance for the reactive magnetic flux that flows toward the rotor 2, and a magnetic resistance for the main magnetic flux that flows toward the yoke 11 is smaller than a magnetic resistance for the main magnetic flux that flows toward at least one tooth 12 close to the main magnetic flux.

The configuration makes it difficult for the reactive magnetic flux generated from the armature AR to flow toward the rotor 2, thus reducing the magnetic path of the reactive magnetic flux that links to one phase armature winding. This sufficiently generates interlinkage magnetic flux to one phase armature winding irrespective of using low armature current (voltage) to weaken the effects of the main magnetic flux of a magnetic pole of the rotating rotor 2; this main magnetic flux attempts to link to the one phase armature winding.

This reduces the main magnetic flux of a magnetic pole of the rotating rotor 2, thus reducing the back electromotive force generated from the motor M. The reduction in the back electromotive force generated from the motor M allows the rotational speed of the motor M (rotor 2) to be increased with little consideration of the back electromotive force.

In addition, the configuration enhances the reactive magnetic flux without reducing the number of interlinkage to one phase winding because the second magnetic resistance facilitates the main magnetic flux to flow toward the yoke 11 as compared with the main magnetic flux toward at least one tooth 12 close to the main magnetic flux.

This balances both maintenance of torque at a low speed range of the motor M and increase in the rotational speed of the motor M.

With the motor M, the at least one pair of magnetic poles 21 and 23 includes a permanent magnet pole 21 mounted on the outer surface of the rotor 2, and the projecting end of each of the plurality of teeth 12 is formed with a magnetic-path extension 15 projecting to both circumferential sides thereof. The magnetic-path extensions 15 of the plurality of teeth 12 are circumferentially arranged with spaces therebetween. Each of the magnetic-path extensions has a radial thickness a. The radial thickness is equal to or more than double of a radial length d of the gap. A circumferential length b of each of the spaces is equal to or shorter than the radial length d of the gap.

This configuration allows merely change of a punch and a die for punching out the armature AR from a normal punch and a die to reduce the magnetic resistance for the reactive magnetic flux that flows through at least one tooth 12 in the plurality of teeth 12 to an adjacent tooth 12 as compared with the magnetic resistance for the reactive magnetic flux that flows toward the rotor 2.

The motor M is configured such that each of the plurality of teeth 12 is tapered toward the rotor 2 to have a circumferentially narrowest width c, and the radial thickness a of each of the magnetic-path extensions 15 is greater than the circumferentially narrowest width c. This configuration effectively enhances the self-inductance of each armature winding 3.

The motor M is configured such that the yoke 11 and the plurality of teeth 12 constitute an armature core 1, and the armature core 1 is comprised of a plurality of magnetic steel sheets SH laminated on each other. Each of the plurality of magnetic steel sheets SH has a thickness t, and the circumferential length b of each of the spaces is longer than the thickness t of each of the plurality of magnetic steel sheets SH. This configuration prevents the reactive magnetic flux from flowing toward the rotor 2 (see FIG. 6), thus effectively enhancing the self-inductance of each armature winding 3.

The motor M is configured such that, when the total number of the magnetic-path extensions 15 is represented by g, the number of phase of the multiphase armature windings 3 is represented by m (m is an integer equal to or greater than 3), the number of poles of the rotor 2 is represented by 2p (p is a natural number), and the number of teeth 12 per pole and per phase in the plurality of teeth 12 is represented by n (n is a natural number), the total number g of the magnetic-path extensions 15 is expressed by the following equation:

$$g = 2p \times m \times n \times 2$$

This configuration allows the design rules of the motor M to be formulated, which allows anyone to easily design the motor M with the aforementioned characteristics. This configuration also uniforms the qualities of the motors M according to this embodiment.

The motor M is configured such that each of the plurality of teeth 12 is comprised of a tapered portion 14 radially extending from the inner surface of the yoke 11 to be tapered up to a corresponding one of the magnetic-path extensions 15 to have a substantially trapezoid shape in a radial cross section thereof.

As described above, the motor M according to this embodiment uses a joint of the plurality of conductor segments 7 having a rectangular shape in its lateral cross section as each of the three-phase armature windings 3. When the motor uses a joint of the plurality of conductor segments 7 having a rectangular shape in its lateral cross section as each of the three-phase armature windings 3, the configuration clarifies the design rules of each of the magnetic-path extensions 15.

The motor M is configured such that the permanent magnet pole 21 is made of a rear-earth magnet.

This configuration effectively obtains the field weakening with a relatively low current as compared with using ferrite magnets, making it possible to balance both reduction of the motor M in size and increase in the rotational speed of the motor M without using specific control.

The motor M is configured such that each of the multiphase armature windings 3 is a joint of the conductor segments 7, and each of the conductor segments 7 has a substantially U-shape with first and second ends and contained in a predetermined pair of slots in the plurality of slots. The first and second ends project from the predetermined pair of slots, one of the first and second ends of one of the conductor segments 7 is joined to one of the first and second ends of another one of the conductor segments 7, and a number NU of the conductor segments of the multiphase armature windings is expressed by the following equation:

$$NU = 2p \times m \times n \times k$$

where k is a natural number.

If a continuous wire were used as each of the three-phase armature windings 3 and the width of the continuous wire were shorter than the circumferential length b of each space between second portions 15, it would be difficult to insert continuous wires into corresponding slots of the armature core 1 from their inner sides through corresponding spaces b.

However, the configuration allows each of the armature windings 3 to be easily wound in the slots of the armature core 1, making it possible to easily manufacture the armature AR.

The motor M is configured such that each of the conductor segments 7 has a length and a rectangular shape in a cross section perpendicular to the length direction.

Using each of the plurality of conductor segments 7 having the rectangular shape in the cross section perpendicular to the length direction allows an increase in the electric loading of the motor M, in other words, an increase in the number of ampere-turns in each of the three-phase armature windings 3.

In this embodiment, the present disclosure is applied to a consequent pole motor, but can be applied to various types of rotary electric machines, such as surface permanent magnet motors without using the consequent poles 23, which can achieve substantially the same effects as the motor M.

The present disclosure can be applied to concentrated winding motors. Note that, if the structure of a concentrated, short-pitch winding motor is substantially identical to that of a distributed, full-pitch winding motor except for the winding configuration, output torque of the distributed, full-pitch winding motor is greater than that of the concentrated, short-pitch winding motor because the winding factor of the distributed, full-pitch winding motor is higher than that of the concentrated, short-pitch winding motor. Thus, a reduction of magnetic-circuit sizes of the motor M in the axial direction while maintaining the torque-characteristic allows the main magnetic flux from the rotor 2 to be reduced. This further reduces the back electromotive force generated from the motor M, making it possible to increase the rotational speed of the motor M. That is, in order to reduce magnetic-circuit sizes of the motor M in the axial direction, the surface area of each of the permanent magnet poles 21 can be reduced. This modification reduces the main magnetic flux from the rotor 2 to thereby reduce internal voltage drop in the motor M. This increases the utilization factor of the voltage applied to the armature windings 3, thus causing a large amount of armature current to flow through each of the armature windings 3. This further increases the rotational speed of the motor M.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A rotary electric machine comprising:
an armature comprising:
an annular yoke having an inner surface; and
a plurality of teeth radially projecting individually from the inner surface of the annular yoke, the plurality of teeth being circumferentially arranged to provide a plurality of slots therebetween, projecting end surfaces of the plurality of teeth providing an inner surface of the armature, the armature being designed to generate reactive magnetic flux when energized; and
a rotor having at least one pair of magnetic poles and having an outer surface, the rotor being rotatably provided inside the armature with a gap between the outer surface thereof and the inner surface of the armature, the armature and rotor being configured to have:
a first magnetic resistance facilitating the reactive magnetic flux to flow through at least one tooth in the plurality of teeth to an adjacent tooth of the at least one tooth as compared with the reactive magnetic flux toward the rotor, and
a second magnetic resistance facilitating main magnetic flux based on the at least one pair of magnetic poles to flow toward the yoke as compared with the main magnetic flux toward at least one tooth close to the main magnetic flux, wherein:
a projecting end of each of the plurality of teeth is formed with a magnetic-path extension projecting to both circumferential sides thereof, the magnetic-path extensions of the plurality of teeth are circumferentially arranged with no spaces therebetween, and a circumferential length of each of the spaces is equal to or shorter than a radial length of the gap,
the rotary electric machine further comprises: multiphase armature windings provided in the plurality of slots for generating the reactive magnetic flux when energized, wherein, when a total number of the magnetic-path extension is represented by g, a number of phase of the multiphase armature windings is represented by m (m is an integer equal or greater than 3), a number of poles of the rotor is represented by 2p (p is a natural number), and a number of teeth per pole and phase in the plurality of teeth is represented by n (n is a number), the total number g of the magnetic-path extension is expressed by the following equation:

$$g = 2p \times m \times n \times 2.$$

2. The rotary electric machine according to claim 1, wherein each of the magnetic-path extensions has a radial thickness, the radial thickness being equal to or more than double of a radial length of the gap.

3. The rotary electric machine according to claim 2, wherein each of the plurality of teeth has a circumferentially narrowest width, and the radial thickness of each of the magnetic-path extensions being greater than the circumferentially narrowest width.

4. The rotary electric machine according to claim 2, wherein the yoke and the plurality of teeth constitute a core of the armature, the core of the armature is comprised of a plurality of magnetic steel sheets laminated on each other, each of the plurality of magnetic steel sheets having a thickness, the circumferential length of each of the spaces being longer than the thickness of each of the plurality of magnetic steel sheets.

5. The rotary electric machine according to claim 3, wherein each of the plurality of teeth comprises a tapered portion radially extending from the inner surface of the yoke to be tapered up to a corresponding one of the magnetic-path extensions to have a substantially trapezoid shape in a radial cross section thereof.

6. The rotary electric machine according to claim 1, wherein the at least one pair of magnetic poles include a permanent pole mounted on the outer surface of the rotor.

7. The rotary electric machine according to claim 1, wherein each of the multiphase armature windings is a joint of conductor segments, each of the conductor segments has a substantially U-shape with first and second ends and contained in a predetermined pair of slots in the plurality of slots such that the first and second ends project from the predetermined pair of slots, one of the first and second ends of one of the conductor segments being joined to one of the first and second ends of another one of the conductor segments, a number NU of the conductor segments of the multiphase armature windings being expressed by the following equation:

$$NU = 2p \times m \times n \times k$$

where k is a natural number.

8. The rotary electric machine according to claim 7, wherein each of the conductor segments has a length and a rectangular shape in a cross section perpendicular to the length direction.

9. A rotary electric machine comprising:
an armature comprising:
an annular yoke having an inner surface; and
a plurality of teeth radially projecting individually from the inner surface of the annular yoke, the plurality of teeth being circumferentially arranged to provide a plurality of slots therebetween, projecting end surfaces of the plurality of teeth providing an inner surface of the armature, the armature being designed to generate reactive magnetic flux when energized; and
a rotor having at least one pair of magnetic poles and having an outer surface, the rotor being rotatably provided inside the armature with a gap between the outer surface thereof and the inner surface of the armature,
the armature and rotor being configured to have:
a first magnetic resistance facilitating the reactive magnetic flux to preferentially flow through at least one tooth in the plurality of teeth to an adjacent tooth of the at least one tooth rather than toward the rotor, and
a second magnetic resistance facilitating main magnetic flux based on the at least one pair of magnetic poles to preferentially flow toward the yoke rather than toward at least one tooth close to the main magnetic flux, wherein:
a projecting end of each of the plurality of teeth is formed with a magnetic-path extension projecting to both circumferential sides thereof, the magnetic-path extensions of the plurality of teeth are circumferentially arranged with no spaces therebetween, and a circumferential length of each of the spaces is equal to or shorter than a radial length of the gap,
the rotary electric machine further comprises: multiphase armature windings provided in the plurality of slots for generating the reactive magnetic flux when energized, wherein, when a total number of the magnetic-path extension is represented by g, a number of phase of the multiphase armature windings is represented by m (m is an integer equal or greater then 3), a number of poles of the rotor is represented by 2p (p is a natural number), and a number of teeth per pole and phase in the plurality of teeth is represented by n (n is a number), the total number g of the magnetic-path extension is expressed by the following equation:

$$g = 2p \times m \times n \times 2.$$

10. A rotary electric machine comprising:
an armature comprising:
an annular yoke having an inner surface; and
a plurality of teeth radially projecting individually from the inner surface of the annular yoke, the plurality of teeth being circumferentially arranged to provide a plurality of slots therebetween, projecting end surfaces of the plurality of teeth providing an inner surface of the armature, the armature being designed to generate reactive magnetic flux when energized; and
a rotor having at least one pair of magnetic poles and having an outer surface, the rotor being rotatably provided inside the armature with a gap between the outer surface thereof and the inner surface of the armature,
the armature and rotor being configured to have:
a magnetic resistance for the reactive magnetic flux that flows through at least one tooth in the plurality of teeth to an adjacent tooth is smaller than a magnetic resistance for the reactive magnetic flux that flows toward the rotor, and
a magnetic resistance for a main magnetic flux that flows toward the yoke is smaller than a magnetic resistance for the main magnetic flux that flows toward at least one tooth close to the main magnetic flux, wherein:
a projecting end of each of the plurality of teeth is formed with a magnetic-path extension projecting to both circumferential sides thereof, the magnetic-path extensions of the plurality of teeth are circumferentially arranged with no spaces therebetween, and a circumferential length of each of the spaces is equal to or shorter than a radial length of the gap,
the rotary electric machine further comprises: multiphase armature windings provided in the plurality of slots for generating the reactive magnetic flux when energized, wherein, when a total number of the magnetic-path extension is represented by g, a number of phase of the multiphase armature windings is represented by m (m is an integer equal or greater then 3), a number of poles of the rotor is represented by 2p (p is a natural number), and a number of teeth per pole and phase in the plurality of teeth is represented by n (n is a number), the total number g of the magnetic-path extension is expressed by the following equation:

$$g = 2p \times m \times n \times 2.$$

11. The rotary electric machine according to claim 6, wherein the permanent magnet pole is a made of a rare-earth magnet.

12. The rotary electric machine according to claim 9, wherein the at least one pair of magnetic poles includes a permanent magnet pole mounted on the outer surface of the rotor.

13. The rotary electric machine according to claim 10, wherein the at least one pair of magnetic poles includes a permanent magnet pole mounted on the outer surface of the rotor.

* * * * *